(12) United States Patent
Katano (10) Patent No.: US 9,209,466 B2
(45) Date of Patent: Dec. 8, 2015

(54) FUEL CELL SYSTEM

(75) Inventor: Koji Katano, Toyota (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 7 days.

(21) Appl. No.: 13/701,693

(22) PCT Filed: Jun. 3, 2010

(86) PCT No.: PCT/JP2010/003718
§ 371 (c)(1),
(2), (4) Date: Dec. 3, 2012

(87) PCT Pub. No.: WO2011/151864
PCT Pub. Date: Dec. 8, 2011

(65) Prior Publication Data
US 2013/0071767 A1     Mar. 21, 2013

(51) Int. Cl.
*H01M 8/04* (2006.01)
*H01M 8/10* (2006.01)

(52) U.S. Cl.
CPC ........ *H01M 8/04089* (2013.01); *H01M 8/0432* (2013.01); *H01M 8/0441* (2013.01); *H01M 8/04097* (2013.01); *H01M 8/04365* (2013.01); *H01M 8/04388* (2013.01); *H01M 8/04402* (2013.01); *H01M 8/04559* (2013.01); *H01M 8/04574* (2013.01); *H01M 8/04589* (2013.01); *H01M 8/04753* (2013.01); *H01M 8/04761* (2013.01); *H01M 8/04179* (2013.01); *H01M 2008/1095* (2013.01); *Y02E 60/50* (2013.01)

(58) Field of Classification Search
USPC ....................................................... 429/444
See application file for complete search history.

(56) References Cited

U.S. PATENT DOCUMENTS 5,919,584 A * 7/1999 Akagi ............................ 429/416
6,602,628 B2 * 8/2003 Ueda et al. ..................... 429/423

FOREIGN PATENT DOCUMENTS

| JP | 2004-296350 | A |    | 10/2004 |              |
|----|-------------|---|----|---------|--------------|
| JP | 2005-044533 |   | *  | 2/2005  | .............. H01M 8/04 |
| JP | 2005-044533 | A |    | 2/2005  |              |
| JP | 2005-268178 | A |    | 9/2005  |              |
| JP | 2006-324058 | A |    | 11/2006 |              |
| JP | 2007-250555 |   | *  | 9/2007  | .............. H01M 8/04 |
| JP | 2007-250555 | A |    | 9/2007  |              |
| JP | 2007-280801 |   | *  | 10/2007 | .............. H01M 8/04 |
| JP | 2007-280801 | A |    | 10/2007 |              |
| JP | 2007-311039 | A |    | 11/2007 |              |
| JP | 2009-059556 | A |    | 3/2009  |              |

* cited by examiner

*Primary Examiner* — Ula C Ruddock
*Assistant Examiner* — Osei Amponsah
(74) *Attorney, Agent, or Firm* — Kenyon & Kenyon LLP (57) ABSTRACT

A fuel cell system equipped with a fuel cell, a pressure control unit, and an exhaust. The pressure control unit is provided on the fuel gas flow path in which the fuel gas to be supplied to the fuel cell flows, and it is able to control the pressure of the fuel gas to be supplied to the fuel cell. The exhaust valve is provided on the fuel exhaust gas flow path in which the fuel exhaust gas exhausted from the fuel cell flows, and when the valve is opened, at least a portion of the fuel exhaust gas can be exhausted to outside the fuel exhaust gas flow path. The pressure control unit is controlled, so that before opening the exhaust valve, the pressure of the fuel gas to be supplied to the fuel cell is decreased beyond what it was up to that point. Then, when the pressure of the fuel gas to be supplied to the fuel cell is the decreased first pressure, the exhaust valve is opened.

6 Claims, 8 Drawing Sheets

FUEL CELL SYSTEM

This is a 371 national phase application of PCT/JP2010/003718 filed 3 Jun. 2010, the contents of which are incorporated herein by reference.

FIELD OF THE INVENTION

The present invention relates to the operation of a fuel cell.

BACKGROUND OF THE INVENTION

Conventionally, with fuel cell systems, there are systems which circulate hydrogen gas as the fuel gas, and as the impurities within the fuel gas increase, execute exhausting of a portion of the exhaust gas to outside the circulation system, a so-called "purge operation." Then, for example, with the technology of Patent Document 1, when it is determined that a purge operation has been executed, after the point in time when the exhaust and drainage valve is open (on), spraying of hydrogen gas to the fuel cell from the injector is stopped, and the hydrogen pump is stopped so circulation of hydrogen gas from the circulation flow path to the hydrogen supply flow path is stopped. Meanwhile, when it is determined that a purge operation has not been operated, the normal control of the injector continues. Specifically, the injector's gas spray time and gas spray timing are controlled, regulating the flow volume and pressure of the hydrogen gas supplied to the fuel cell.

SUMMARY OF INVENTION

Problem the Invention Attempts to Solve

However, with the prior art noted above, there is no consideration of hydrogen gas passing through a membrane electrode assembly (MEA) from the anode (hydrogen electrode, negative electrode) to the cathode (oxygen electrode, positive electrode), so-called "cross leak." There is also no consideration regarding the relationship of the opening and closing force of the exhaust and drainage valve for exhausting fuel gas containing a large amount of impurities from the fuel gas circulation system, and the pressure of the fuel gas circulation system.

When the pressure of the fuel gas circulation system is set high, there is a higher volume of hydrogen gas passed through the membrane electrode assembly (MEA) from the anode (hydrogen electrode, negative electrode) to the cathode (oxygen electrode, positive electrode). Thus, from the perspective of cross leak reduction, it is preferable to set the pressure of the fuel gas circulation system low. When the pressure of the fuel gas circulation system is set low, the exhaust and drainage valve diameter is set to be large. This is because in a state when the pressure difference with the outside is small, that makes it possible to exhaust a suitable is amount of gas to the outside from the fuel gas circulation system within a set time.

Meanwhile, the pressure of the fuel gas circulation system is dynamically controlled. Then, for designated purposes, the pressure of the fuel gas circulation system is temporarily controlled to a low value. The drive device that drives the exhaust and drainage valve must open and close the exhaust and drainage valve so as to ensure a suitable flow volume even with that kind of small pressure difference inside and outside the system. Accordingly, when the diameter of the exhaust and drainage valve is set to be large, so as to be able to suitably open and close the valve even when a pressure difference such as that presses the valve in the valve closing direction occurs inside or outside the system, the drive device that drives the exhaust and drainage valve must be a large item that is able to generate a large force. As a result, the fuel cell system itself must be large. This kind of problem is not limited just to vehicles in which fuel cells are installed, but exists broadly for fuel cell systems for which smaller size and lighter weight are desired.

The present invention was created to address at least a portion of the problems described above, and an object is to make the fuel cell system more compact while reducing cross leak with the fuel cell system.

Means for Solving the Problem

The present invention can be realized as the following modes or application examples for addressing at least a portion of the problems described above.

[Aspect 1]
A fuel cell system, comprising:
a fuel cell,
a pressure control unit provided in a fuel gas flow path in which fuel gas to be supplied to the fuel cell flows, the pressure control unit being capable of controlling a pressure of the fuel gas to be supplied to the fuel cell,
an exhaust valve provided on a fuel exhaust gas flow path in which fuel exhaust gas exhausted from the fuel cell flows, wherein when the exhaust valve is opened, the exhaust valve is capable of exhausting to an outside of the fuel exhaust gas flow path at least a portion of the fuel exhaust gas, and
a control unit that controls the fuel system, wherein
the control unit
opens the exhaust valve when the pressure of the fuel gas to be supplied to the fuel cell is a first pressure, and
controls the pressure control unit to make the pressure of the fuel gas to be supplied to the fuel cell a second pressure at least for a designated time period after the exhaust valve is opened, the second pressure being higher than the first pressure.

According to the above aspect, the exhaust valve opens when at the first pressure that is lower than the second pressure. Consequently, it is possible to open the exhaust valve with a low power. Accordingly, even if the pressure within the fuel gas flow path during steady operation is set low to reduce cross leak, and the exhaust valve diameter is made to be large, it is possible to provide a small exhaust valve. Specifically, it is possible to make the fuel cell system more compact while reducing cross leak. Then, with the above aspect, compared to a mode for which the pressure of the fuel gas to be supplied to the fuel cell is not raised after the exhaust valve is opened, it is possible to exhaust the fuel gas from the exhaust valve to outside the fuel exhaust gas flow path in a shorter time.

What is referred to as an "exhaust valve" here includes devices for driving the valve in addition to the valve itself. Also, the time period for which the pressure of the fuel gas to be supplied to the fuel cell is set to the second pressure may start immediately after the exhaust valve is opened, or may start after a designated time has passed from the timing the exhaust valve is opened. Also, the time period for which the pressure of the fuel gas is the second pressure may also end before the exhaust valve closes, or may end after the exhaust valve closes.

[Aspect 2]
The fuel cell system according to aspect 1, wherein
the control unit
performs feedback control of the pressure control unit so that the pressure of the fuel gas to be supplied to the fuel cell keeps a designated pressure when power generation is performed at the fuel cell, and based on a change in at least one of a feedback signal in the feedback control and an operating state of the pressure control unit, detects that the exhaust valve has opened, and sets the pressure of the fuel gas to be supplied to the fuel cell to the second pressure.

According to the above aspect, it is possible to detect feedback signals or changes in the operating state of the pressure control unit due to the exhaust valve actually opening, and to perform control to raise the pressure of the fuel gas to be supplied to the fuel cell. Thus, there is no obstruction of valve opening for the exhaust valve due to pressure raising control.

[Aspect 3]

The fuel cell system according to aspect 1, further comprising:

a pressure sensor for detecting, downstream from the pressure control unit, at least one of pressures of the fuel gas to be supplied to the fuel cell and the fuel exhaust gas, wherein the control unit detects that the exhaust valve has opened based on a decrease in a measured value obtained by the pressure sensor.

When using this kind of mode, it is possible to detect a decrease in the pressure due to the exhaust valve actually opening, and to perform control to raise the pressure of the gas to be supplied to the fuel cell. Thus, there is no obstruction of valve opening for the exhaust valve due to pressure raising control.

[Aspect 4]

The fuel cell system according to any of aspects 1 through 3, wherein the control unit, after setting the pressure of the fuel gas to be supplied to the fuel cell to the second pressure, controls the pressure control unit to make the pressure of the fuel gas to be supplied to the fuel cell a third pressure in a state with the exhaust valve opened, the third pressure being higher than the second pressure.

Water exhausted from the fuel cell may exist as a liquid in the fuel exhaust gas flow path. Then, when the liquid water and gas are exhausted from the exhaust valve, after the exhaust valve is opened, first, the liquid water is exhausted to outside the fuel exhaust gas flow path, and after that, gas containing impurities and unreacted fuel gas is exhausted. Meanwhile, when the pressure inside the fuel exhaust gas flow path is high, and the pressure difference with outside the fuel exhaust gas flow path is large, when the liquid water is exhausted from the exhaust valve, cavitation may occur, and water may not be exhausted efficiently.

With the above aspect noted above, when exhausting liquid water from the exhaust valve at the start, the pressure of the fuel gas to be supplied to the fuel cell is set to the relatively low second pressure. As a result, the pressure of the fuel exhaust gas flow path is also kept low. Then, after the water is exhausted, the pressure of the fuel gas to be supplied to the fuel cell is set to a higher third pressure. As a result, the pressure of the fuel exhaust gas flow path also becomes higher. Accordingly, it is possible to exhaust the gas efficiently.

[Aspect 5]

The fuel cell system according to aspect 4 dependent on aspect 1 or 2, further comprising:

a pressure sensor for detecting at least one of pressures of the fuel gas to be supplied to the fuel cell and the fuel exhaust gas, downstream from the pressure control unit, wherein the control unit, after the decrease of the measured value obtained by the pressure sensor in a designated time period has exceeded a designated threshold value, performs the process of making the pressure of the fuel gas to be supplied to the fuel cell the third pressure.

When water is exhausted from the exhaust valve, the pressure of the fuel gas flow path, within the fuel cell, and of the fuel exhaust gas flow path decreases gradually, without having a sudden decrease. Meanwhile, after the water is exhausted from the exhaust valve, specifically, when the gas is exhausted, the pressure of the fuel gas flow path, within the fuel cell, and of the fuel exhaust gas flow path decreases sharply. Accordingly, according to the above aspect, after the exhausting of the gas actually starts, it is possible to increase the pressure of the fuel gas to be supplied to the fuel cell, and thus the pressure of the fuel exhaust gas flow path.

[[**]]

The pressure sensor that aspect 3 is equipped with and the pressure sensor that aspect 5 is equipped with can be a single item or can be separate items.

It is possible to adopt the following aspect: the control in which the pressure of the fuel gas to be supplied to the fuel cell is set to the third pressure is performed after a designated time has elapsed since the valve is opened. According to this aspect, it is possible to respectively exhaust water and gas from the exhaust valve efficiently by simple control.

[Aspect 6]

The fuel cell system according to aspect 1 or 2, further comprising:

a circulation flow path that returns a portion of the exhaust gas flowing inside the fuel exhaust gas flow path to the fuel gas flow path, a temperature sensor for determining a temperature of the fuel cell, an ammeter for determining the volume of current flowing from the fuel cell, a first pressure sensor that measures a pressure of the fuel gas supplied from a fuel gas supply source to the pressure control unit, and a second pressure sensor that measures a pressure of the fuel gas supplied from the pressure control unit to the fuel cell, wherein the pressure control unit is an injector provided in the fuel gas flow path between the fuel gas supply source and the fuel cell, the injector being capable of supplying hydrogen gas as fuel gas supplied from the fuel gas supply source to the fuel cell at a controlled pressure, wherein the control unit when the valve is open, while exhausting gas from the exhaust valve, supplies fuel gas supplied from the fuel gas supply source via the pressure control unit to the fuel cell, and when a parameter exceeds a designated value, closes the exhaust valve, the parameter being obtained based on the pressure of the fuel gas supplied from the fuel gas supply source to the pressure control unit, the pressure of the fuel gas supplied by the pressure control unit to the fuel cell, the temperature of the fuel cell, and the current that the fuel cell outputs.

The gas exhausted from the exhaust valve contains hydrogen gas as the fuel gas, and nitrogen and water vapor as the impurities. The molecular weights of these gases are respectively 2, 14, and 18. Thus, the mean molecular weight of the gas exhausted from the exhaust valve is 2 to 18. Meanwhile, the molecular weight of the hydrogen gas as a fuel gas is 2. Accordingly, when the valve is opened, gas containing a large volume of impurities is exhausted from a system including a fuel gas flow path, a fuel cell, and a fuel exhaust gas flow path via an exhaust valve, and when fuel gas is supplied to that system from the fuel gas supply source, the mean molecular weight of the gas exhausted via the exhaust valve gradually becomes smaller. When this mean molecular weight becomes smaller than a designated value, it is possible to determine that impurities have been sufficiently exhausted from the system including the fuel exhaust gas flow path, the fuel cell, and the fuel exhaust gas flow path.

Meanwhile, the square root of the mean molecular weight of the gas exhausted from the exhaust valve is inversely proportional to the flow volume per unit of time of the gas exhausted from the exhaust valve.

Then, of the gases exhausted from the exhaust valve, nitrogen mixes into the fuel exhaust gas flow path due to mainly cross leak that occurs at the fuel cell. The volume of cross leak correlates to the temperature of the fuel cell.

Also, of the gases exhausted from the exhaust valve, the water vapor is mainly due to the water generated with power generation at the fuel cell. The volume of this water vapor correlates to the current volume of the power generation at the fuel cell and the temperature of the fuel cell.

Furthermore, of the gases exhausted from the exhaust valve, the volume of the hydrogen gas is obtained as the difference between the hydrogen supplied to the fuel cell via the injector and the hydrogen consumed by power generation with the fuel cell. Then, the volume of hydrogen supplied to the fuel cell via the injector is determined from the pressure difference before and after the pressure control unit.

With the mode noted above, the exhaust valve closes when the parameters obtained based on the pressure of the fuel gas supplied to the pressure control unit, the pressure of the fuel gas supplied to the fuel cell from the pressure control unit, the temperature of the fuel cell, and the current of the fuel cell exceed a designated value. By using that kind of mode, it is possible to close the exhaust valve in a state with impurities sufficiently exhausted from the gas circulating in the system.

[Aspect 7]

The fuel cell system according to any of aspects 1 through 6, wherein the control unit controls the pressure control unit to decrease the pressure of the fuel gas to be supplied to the fuel cell before closing the exhaust valve, and closes the exhaust valve in a state for which the pressure of the fuel gas to be supplied to the fuel cell is decreased.

According to the above aspect, by closing the exhaust valve, it is possible to prevent the situation of the pressure of the system including a fuel gas flow path, a fuel cell, and a fuel exhaust gas flow path from rising to an undesirable level.

[Aspect 8]

An operating method of a fuel cell system, wherein the fuel cell system comprises:

a fuel cell, a pressure control unit provided on a fuel gas flow path in which fuel gas to be supplied to the fuel cell flows, the pressure control unit being capable of controlling a pressure of the fuel gas to be supplied to the fuel cell, and an exhaust valve provided on a fuel exhaust gas flow path in which fuel exhaust gas exhausted from the fuel cell flows, wherein when the exhaust valve is opened, the exhaust valve is capable of exhausting to an outside of the fuel exhaust gas flow path at least a portion of the fuel exhaust gas, and wherein the method comprises (a) a step of opening the exhaust valve when the pressure of the fuel gas supplied to the fuel cell is a first pressure, and (b) a step of controlling the pressure control unit to make the pressure of the fuel gas to be supplied to the fuel cell a second pressure after the exhaust valve is opened, the second pressure being higher than the first pressure.

The present invention can be realized in various modes other than that noted above, and for example can also be realized in modes such as a fuel cell installation method, a fuel cell system, a vehicle with a fuel cell installed or the like.

Following, details of preferred embodiments of the invention of this application are described with reference to the drawings, clarifying the object of the invention of this application described above in addition to other objects, configurations, and effects.

DETAILED DESCRIPTION

Following, we will describe modes for carrying out the present invention based on embodiments.

A. FIRST EMBODIMENT

A1. Overall Constitution of the Device

Figure 1:
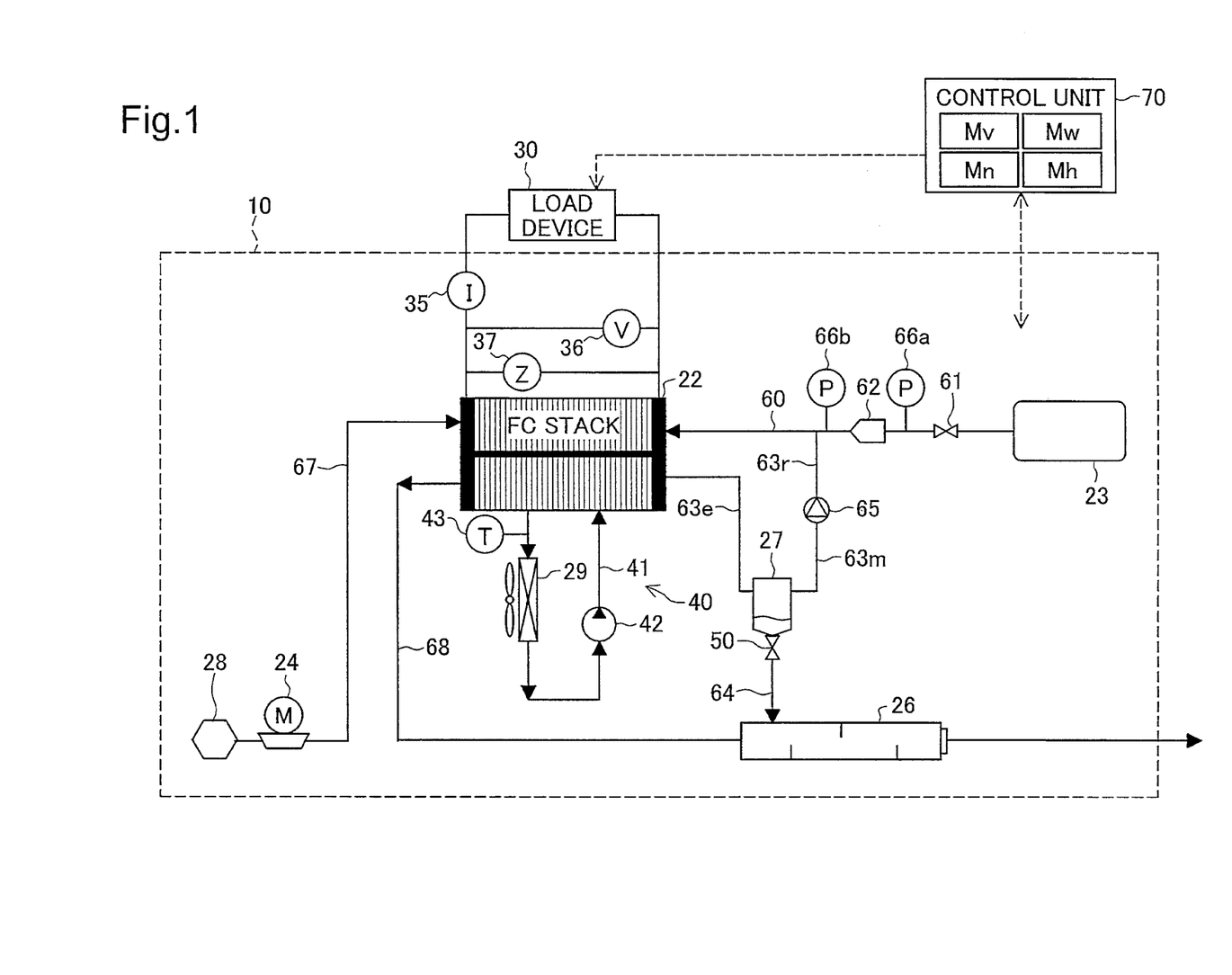
FIG. 1 is a block diagram schematically showing the constitution of the fuel system 10 which is an embodiment of the present invention.

FIG. 1 is a block diagram schematically representing the constitution of the fuel cell system 10 which is an embodiment of the present invention. The fuel cell system 10 is equipped with a fuel cell 22 which is the power generating main unit, a hydrogen tank 23 which stores hydrogen supplied to the fuel cell 22, and an air compressor 24 for supplying compressed air to the fuel cell 22. As the fuel cell 22, it is possible to use various types of fuel cells, but with this embodiment, a solid polymer type fuel cell is used as the fuel cell 22. This fuel cell 22 has a stacked constitution with a plurality of single cells laminated.

The hydrogen tank 23 can for example be a hydrogen cylinder for storing high pressure hydrogen. Alternatively, it is also possible to use a tank for storing hydrogen by equipping a hydrogen occlusion alloy in the interior and occluding it in the hydrogen occlusion alloy. The hydrogen gas stored in the hydrogen tank 23, after being discharged to the hydrogen gas supply path 60, is adjusted to a designated pressure by the injector 62, and supplied to the anode of the fuel cell 22. An FC inlet shut valve 61 is provided on the hydrogen gas supply path 60.

The injector 62 has two states, the valve open state and the valve closed state. With the injector 62, "time period To in a state with the valve open" and "time period Tc in a state with the valve closed" are respectively fixed to designated values, and it is possible to repeat the valve open state and the valve closed state rapidly. Accordingly, by doing PWM control of the injector 62, it is possible to supply hydrogen gas to the anode of the fuel cell 22 at any pressure.

With the injector 62, the ratio obtained by dividing "time period To in a state with the valve open" by the sum of "time period To in a state with the valve open" and "time period Tc in a state with the valve closed" is called "duty ratio Di" in this specification. By adjusting this duty ratio Di, the injector 62 can supply hydrogen gas to the anode of the fuel cell 22 at any pressure. With this specification, the larger the proportion of time in the valve open state, the more the duty ratio is described as "large."

As shown in FIG. 1, the anode exhaust gas exhausted from the anode of the fuel cell 22 is led to the anode exhaust gas paths 63$e$, 63$m$, and 63$r$, and again flows into the hydrogen gas supply path 60. A hydrogen cylinder 65 is provided midway in the anode exhaust gas paths 63$e$, 63$m$, and 63$r$. The pressure of the anode exhaust gas path 63$e$ and the anode exhaust gas path 63$m$ connected to the downstream side of the anode of the fuel cell 22 is lower than the pressure of the hydrogen gas supply path 60 connected to the upstream side of the fuel cell 22 by the amount of pressure loss of the path within the fuel cell 22 and of the hydrogen gas consumed by the fuel cell 22. The anode exhaust gas that flows through the anode exhaust gas paths 63$e$ and 63$m$ exhausted from the fuel cell 22 is compressed by the hydrogen cylinder 65, the pressure is increased, it is supplied to the anode exhaust gas path 63$r$, and flows into the hydrogen gas supply path 60. In this way, the residual hydrogen gas in the anode exhaust gas is circulated within the flow path and supplied again for an electrochemical reaction.

Also, a gas-liquid separator 27 is provided between the anode exhaust gas path 63$e$ and the anode exhaust gas path 63$m$. Water is generated at the cathode as the electrochemical reaction progresses. The water generated at the cathode is also guided into the gas of the anode side via an electrolyte membrane. With the fuel cell system 10 of this embodiment, to prevent flooding due to this water, the water vapor collected within the anode exhaust gas is condensed in the anode exhaust gas path 63 by the gas-liquid separator 27, and exhausted to outside the system. What is referred to as the "system" here is the gas flow path constituted by the fuel gas supply path 60 for supplying fuel gas to the fuel cell, the flow path of fuel gas within the fuel cell 22, and the anode exhaust gas paths 63$e$, 63$m$, and 63$r$ for supplying the anode exhaust gas exhausted from the fuel cell 22 again to the fuel gas supply path 60.

An on-off valve 50 is provided on the gas-liquid separator 27, and the gas-liquid exhaust path 64 is also connected to this via the on-off valve 50. Then, the gas-liquid exhaust path 64 is connected to the diluter 26. By having the on-off valve 50 in an open state, the water condensed inside the gas-liquid separator 27, and a portion of the anode exhaust gas that flows through the anode exhaust gas path 63 are exhausted into the atmosphere through the diluter 26.

Figure 2:
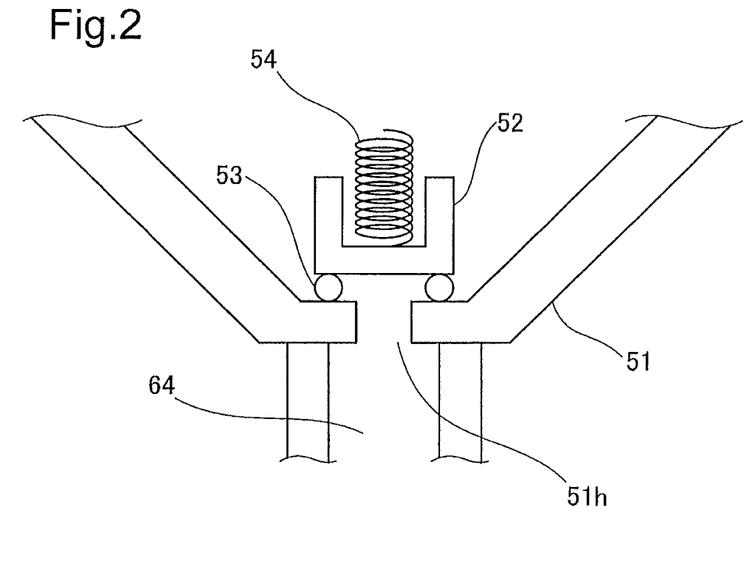
FIG. 2 is an enlarged schematic diagram showing the periphery of the on-off valve 50 of the gas-liquid separator 27.
Figure 3:
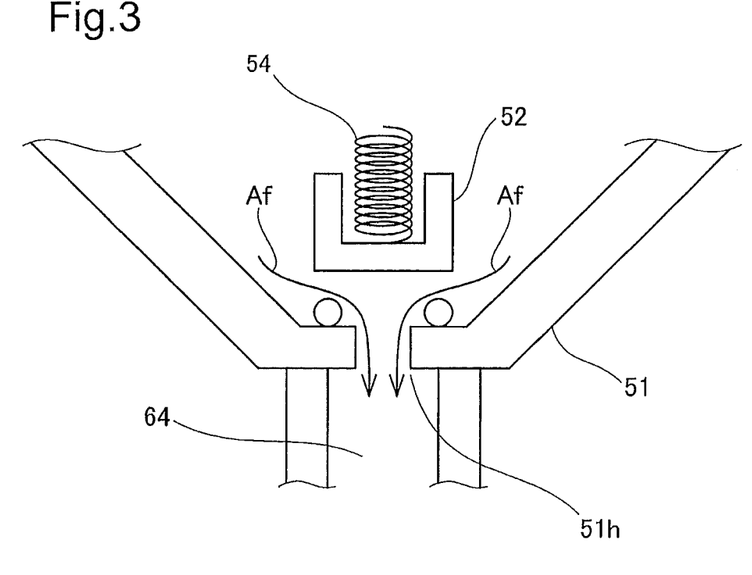
FIG. 3 is an enlarged schematic diagram showing the periphery of the on-off valve 50 of the gas-liquid separator 27.

FIG. 2 and FIG. 3 are enlarged schematic diagrams showing the periphery of the on-off valve 50 of the gas-liquid separator 27. FIG. 2 shows the on-off valve 50 in a closed state. FIG. 3 shows the on-off valve 50 in an open state. The on-off valve 50 is equipped with an outer shell 51 which also serves as the outer shell of the gas-liquid separator 27, a valve body 52, packing 53, and a solenoid 54. The outer shell 51 segments the on-off valve 50 into an interior and exterior, and is equipped with a hole 51$h$. The interior of the on-off valve 50 can be made to communicate with the gas-liquid exhaust path 64 via the hole 51$h$. The packing 53 is provided using an elastically deformable material, and surrounds the hole 51$h$ on the inside of the outer shell 51.

When the valve body 52 is pressed by the packing 53, the hole 51$h$ closes. When the valve body 52 is separated from the packing 53, the interior of the on-off valve 50 is in communication with the gas-liquid exhaust path 64 via the hole 51$h$. The solenoid 54 is provided inside the on-off valve 50, and operates the valve body 52. With the solenoid 54, the valve body 52 is faced toward the outer shell 51 and pressed, and closely adhered with the packing 53, or the valve body 52 is pulled away from the packing 53. As a result, the on-off valve 50 can have two states, the valve open state and the valve closed state. The control unit 70 controls the solenoid 54 of the on-off valve 50 and opens and closes the on-off valve 50.

The on-off valve 50 is provided on the bottom part of the gas-liquid separator 27. Accordingly, when the on-off valve 50 is in an open state (see FIG. 3), all the water condensed within the gas-liquid separator 27 is exhausted to the diluter 26. Then, after that water has been exhausted, a portion of the anode exhaust gas is exhausted to the diluter 26 (see arrow Af in FIG. 3).

The fuel cell system 10 of this embodiment has a constitution whereby the anode exhaust gas path 63 is connected to the hydrogen gas supply path 60, and anode exhaust gas is again supplied for electrochemical reactions. With the fuel cell 22, nitrogen infiltrates through the electrolyte membrane from the cathode side to the anode side. Accordingly, when hydrogen gas is circulated between the fuel cell 22 and the anode exhaust gas path 63, as time passes, the nitrogen concentration on the anode side rises. At the fuel cell system 10, a portion of the anode exhaust gas is exhausted to outside the flow path via the on-off valve 50 at designated time intervals. Consequently, the impurity concentration within the anode exhaust gas path 63 is decreased, and a rise in the concentration of impurities such as nitrogen in the gas supplied to the anode is prevented.

The air compressor 24 shown in FIG. 1 supplies pressurized air as the oxidation gas to the cathode of the fuel cell 22 via the oxidation gas supply path 67. When the air compressor 24 compresses the air, it takes in air from the outside via a mass flow meter 28 equipped with a filter. The cathode exhaust gas exhausted from the cathode is led to the cathode exhaust gas path 68 and exhausted to the outside.

The previously described diluter 26 is provided on the cathode exhaust gas path 68. The diluter 26 is a container with a larger cross section area than that of the gas-liquid exhaust path 64, and one end is opened to the atmosphere. The anode exhaust gas flows into the diluter 26 via the on-off valve 50 connected to the gas-liquid separator 27 and the gas-liquid exhaust path 64. The anode exhaust gas that flows into the diluter 26 is diluted by mixing with the cathode exhaust gas in the diluter 26. After that, the mixed anode exhaust gas and cathode exhaust gas are exhausted into the atmosphere from the cathode exhaust gas path 68. At that time, each device of the fuel cell system 10 such as the air compressor 24 is controlled such that the concentration of hydrogen gas in the exhausted gas is a designated concentration or less.

The fuel cell system 10 is further equipped with a cooling unit 40 for cooling the fuel cell 22 such that the operating temperature of the fuel cell 22 is a designated temperature. The cooling unit 40 is equipped with a cooling water path 41, a cooling pump 42, and a radiator 29. The cooling water path 41 is a flow path that guides cooling water so that the cooling water circulates between the interior of the fuel cell 22 and the radiator 19. The cooling pump 42 circulates cooling water within the cooling water path 41. The radiator 29 is equipped with a cooling fan, and cools cooling water for which the temperature has risen via the interior of the fuel cell 22.

Devices that operate in association with power generation of the fuel cell 22 such as the already described air compressor 24, the cooling pump 42, or a radiator fan or valves provided in flow paths or the like are hereafter referred to as fuel cell auxiliary equipment. This fuel cell auxiliary equipment operates with power supplied from the fuel cell 22.

Connected to the fuel cell 22 is a load device 30 which is a power consuming device for which power is supplied from the fuel cell 22. This load device 30 can include an electric motor that operates with power supplied from the fuel cell 22. Note that in FIG. 1, the load device 30 is represented as an independent load from the fuel cell system 10, but the fuel cell auxiliary equipment described previously is also included in this load device 30. Specifically, in FIG. 1, a device including fuel cell auxiliary equipment such as the air compressor 24 or the like for which power is supplied from the fuel cell 22 is represented as the load device 30.

The fuel cell system 10 is further equipped with a control unit 70 that controls the movement of each part of the fuel cell system 10. The control unit 70 is constituted as a logic circuit with a microcomputer as its core. More specifically, the control unit 70 is equipped with a CPU for executing designated operations or the like according to preset control programs, a ROM in which control programs, control data or the like required for executing various types of arithmetic processing with the CPU are stored in advance, a RAM in which similarly, various types of data required for doing the various types of arithmetic processing with the CPU are temporarily stored, an input/output port for inputting and outputting various types of signals, and the like.

This control unit 70 fetches detection signals of each sensor such as an ammeter 35, a voltmeter 36, an impedance meter 37, a temperature sensor 43, and pressure sensors 66a, 66b and the like provided in each part of the fuel cell system 10, and information relating to load requests with the load device 30. Also, the control unit 70 outputs drive signals to each part relating to power generation of the fuel cell 22 that the fuel cell system 10 is equipped with such as the pump or the valve, radiator fan or the like provided in the flow path. In FIG. 1, to represent the state of the exchange of signals between the fuel cell system 10 structural elements and the control unit 70, the control unit 70 is noted outside the fuel cell system 10.

The fuel cell system 10 is equipped with an ammeter 35 at the circuit connecting the fuel cell 22 and the load device 30 (see FIG. 1). Also, the fuel cell system 10 is equipped in the cooling water path 41 with a temperature sensor 43 for detecting the temperature of the cooling water that is sent from the fuel cell 22 and flows into the radiator 29. Furthermore, the fuel cell system 10 is equipped with a pressure sensor 66a at a position of the hydrogen gas supply path 60 that is downstream from the hydrogen tank 23 and upstream from the injector 62. Then, the fuel cell system 10 is equipped with a pressure sensor 66b at a position of the hydrogen gas supply path 60 that is downstream from the injector 62 and upstream from the fuel cell 22.

The control unit 70 references the maps stored in the control unit 70 in advance, and based on the current volume detected by the ammeter 35, the cooling water temperature detected by the temperature sensor 43, the hydrogen gas pressure detected by the pressure sensors 66a, 66b and the like, performs control of the opening and closing operations of the on-off valve 50, and control of the operation of the injector 62. For example, a valve map Mv, with which the time intervals to open the valve (time when the valve is closed) and the time the valve is open are determined according to the integrated value of the power generation volume of the fuel cell 22, is created in advance and stored within the control unit 70. The valve map Mv has a plurality of sets of data according cooling water temperature segments.

A2. On-Off Valve and Injector Control

As described previously, the control unit 70 references the valve map Mv, and opens and closes the on-off valve 50 based on the integrated value of the power generation volume of the fuel cell 22. Then, the control unit 70 controls the operating state of the injector 62 according to the opening and closing of the on-off valve 50.

Figure 4:
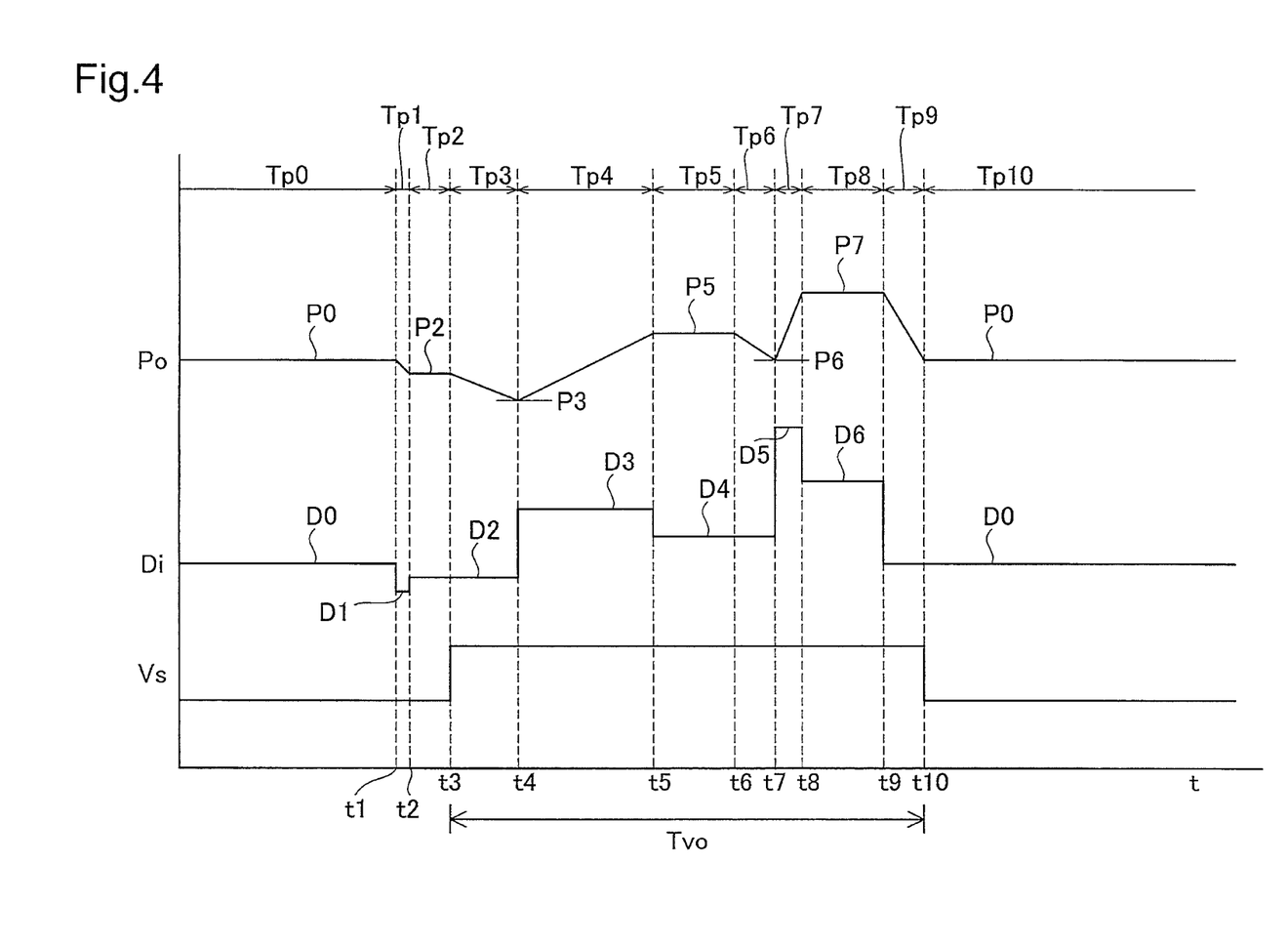
FIG. 4 is a chart showing the injector 62 control contents performed by the control unit 70.

FIG. 4 is a chart showing the control of the injector 62 performed by the control unit 70. Vs shown at the bottom level of FIG. 4 shows the open and closed state of the on-off valve 50. Vs being high indicates that the on-off valve 50 is open. Vs being low indicates that the on-off valve 50 is closed. Di shown in the middle level of FIG. 4 is the duty ratio Di of the injector 62. The injector 62 duty ratio Di can be various values according to the control of the control unit 70. Po shown in the top level of FIG. 4 is the pressure of the hydrogen gas downstream from the injector 62, measured by the pressure sensor 66b (see FIG. 1).

When the control unit 70 determines that the on-off valve 50 should be opened at a designated time t3 according to the valve map Mv, the control unit 70 reduces the pressure of the hydrogen gas downstream from the injector 62 ahead of time t3. In specific terms, first, at time t1, the control unit 70 reduces the duty ratio Di of the injector 62 from the duty ratio D0 up to that point down to D1 (D1<D0), and after that, at time t2, the duty ratio Di of the injector 62 is set to D2 (D1<D2<D0).

As a result, at time period Tp1 between times t1 and t2, the pressure Po of the hydrogen gas on the downstream side of the injector 62 decreases from P0 to P2 (P2<P0). Then, at time period Tp2 between the times t2 and t3, the pressure Po of the hydrogen gas on the downstream side of the injector 62 is kept at P2. P0, P1, and P2 are all higher than the pressure Pd within the gas-liquid exhaust path 64 and the diluter 26.

After that, at time t3, the control unit 70 opens the on-off valve 50. In this way, with this embodiment, before opening the on-off valve 50, the pressure Po of the hydrogen gas of the downstream side of the injector 62 is lowered (see time periods Tp1 and Tp2 in FIG. 4). Accordingly, the pressure Pe within the anode exhaust gas path 63e and the gas-liquid separator 27, when the on-off valve 50 is opened, becomes lower. Specifically, the difference between the pressure Pe within the gas-liquid separator 27 and the pressure Pd within the gas-liquid exhaust path 64 and the diluter 26 becomes smaller. Accordingly, even when the diameter of the valve body 52 is large, it is possible to move the valve body 52 toward the interior of the on-off valve 50 with a small force (see FIG. 2 and FIG. 3). Also, even when the pressure Po on the downstream side of the injector 62 is large for purposes of the operation of the fuel cell system, it is possible to move the valve body 52 toward the interior of the on-off valve 50 with a small force. Thus, as the solenoid 54, it is not necessary to equip a large solenoid capable of generating a large force.

When the on-off valve 50 opens at time t3, the liquid water and gas from the on-off valve 50 are exhausted to the diluter 26 (see FIG. 1 and FIG. 3). As a result, the pressure of the system including the anode exhaust gas path 63e, 63m, and 63r, the flow path of the fuel gas within the fuel cell 22, and the fuel gas supply path 60 (hereafter called the "fuel gas circulation system") decreases. Accordingly, the pressure Po of the hydrogen gas on the downstream side of the injector 62 measured by the pressure sensor 66b decreases (see time period Tp3 in FIG. 4). When it is detected that Po has decreased to the designated pressure P3 (P3<P2), the control unit 70 raises the duty ratio Di of the injector 62 from D2 to D3 (D2<D0<D3). As a result, the pressure Po of the hydrogen gas on the downstream side of the injector 62 rises from P3 to P5 (P5>P0) at the time period Tp4.

After that, the control unit 70 keeps the duty ratio Di of the injector 62 at D4 (D0<D4<D3). As a result, the pressure Po of the hydrogen gas of the downstream side of the injector 62 is kept at P5 (P2<P0<P5) at time period Tp5.

In this way, with this embodiment, after the on-off valve 50 is opened, the pressure Po of the hydrogen gas on the downstream side of the injector 62 is made to be higher than before the valve is opened (see time periods Tp0 and Tp5 in FIG. 4). Accordingly, it is possible to make the pressure within the on-off valve 50 included in the exhaust gas circulation system high. As a result, it is possible to efficiently exhaust water and gas from the on-off valve even when the power generation volume of the fuel cell is low, and the pressure PO is low. Also, when the on-off valve 50 opens, the pressure Po of the hydrogen gas on the downstream side of the injector 62 is a value lower than P5. Accordingly, it is possible to move the valve body 52 toward the inside of the on-off valve 50 with a small force. Thus, as the solenoid 54, it is not necessary to equip a large solenoid that can generate a strong force. Then, the pressure P0 during normal times before the on-off valve 50 is opened is determined without consideration of the exhaust of water and gas from the system. Accordingly, so it is possible to set the pressure P0 during normal operation to a pressure for which cross leak does not occur easily.

Also, with this embodiment, the valve opening of the on-off valve 50 is detected based on pressure changes, and the pressure Po of the hydrogen gas on the downstream side of the injector 62 is made high. Accordingly, the pressure Po of the hydrogen gas before valve opening of the on-off valve 50 does not become high, and it is possible to avoid the situation of the valve opening being obstructed.

After the on-off valve 50 opens at time t3, water is exhausted from the on-off valve 50 until time t6. Accordingly, there is no rapid exhausting of the gas and liquid from the fuel gas circulation system, and rapid decrease in the internal pressure. The reason is as follows: the speed at which the water is exhausted from the on-off valve 50 is slow compared to the speed at which gas is exhausted from the on-off valve 50. At time period Tp5, the duty ratio D4 of the injector 62 for keeping constant the pressure Po of the hydrogen gas of the downstream side of the injector 62 is a value set assuming that water is exhausted from the on-off valve 50 and that gas is not exhausted.

After that, at time t6, exhausting of water from the on-off valve is completed, and exhausting of gas from the on-off valve 50 starts. As a result, the pressure of the fuel gas circulation system decreases rapidly. Accordingly, the pressure Po of the hydrogen gas on the downstream side of the injector 62 decreases rapidly (see time period Tp6 in FIG. 4).

When it is detected that the decrease per unit of time of the pressure Po of the downstream side of the injector 62 has become larger than a designated threshold value Tr6, the control unit 70 raises the duty ratio Di of the injector 62 from D4 to D5 (D3<D4<D5). As a result, the pressure Po of the hydrogen gas of the downstream side of the injector 62 rises from P6 to P7 (P6<P5<P7) at time period Tp7. After that, the control unit 70 keeps the duty ratio Di of the injector 62 at D6 (D4<D6<D5). As a result, the pressure Po of the hydrogen gas on the downstream side of the injector 62 is kept at P7 (P7>P5) at time period Tp8.

In this way, with this embodiment, the fact that the water exhaust is completed and exhausting of gas from the on-off valve 50 has started is detected based on the pressure decrease rate, and then the pressure of the system is made even higher (see time periods Tp6 to Tp8 in FIG. 4). Accordingly, it is possible to efficiently exhaust gas from the on-off valve 50.

After that, the control unit 70 decreases the pressure of the hydrogen gas of the downstream side of the injector 62 ahead of the time t10 at which the on-off valve 50 should be closed according to the valve map Mv. In specific terms, at the time t9 (t9<t10), the duty ratio Di of the injector 62 decreases from the duty ratio D6 up to then down to D0. As a result, at time period Tp9, the pressure Po of the hydrogen gas of the downstream side of the injector 62 decrease from P7 to P0 (P0<P7). Then, at time period Tp10 after time t9, the pressure Po of the hydrogen gas of the downstream side of the injector 62 is kept at P0. In the example in FIG. 4, the power generating state of the fuel cell 22 is consistent and does not change.

After that, at time t10, the control unit 70 closes the on-off valve 50. In this way, with this embodiment, before closing the on-off valve 50, the duty ratio Di of the injector 62 is lowered, and the pressure Po of the hydrogen gas of the downstream side of the injector 62 is made lower (see time periods Tp9 and Tp10 in FIG. 4). Accordingly, it is possible to prevent the circumstance of the pressure Pe within the anode exhaust gas path 63e and the gas-liquid separator 27 becoming higher immediately after the on-off valve 50 is closed.

Figure 5:
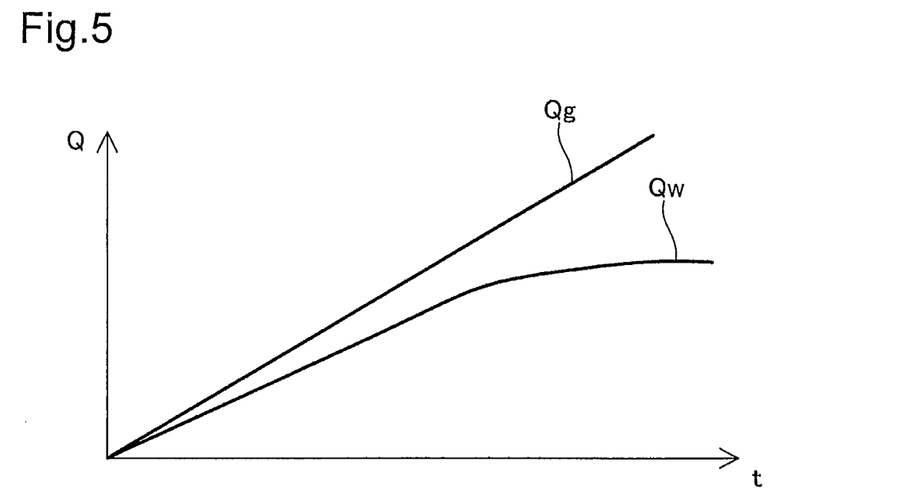
FIG. 5 is a graph showing the exhaust volume of gas and water per unit of time when the pressure Pe within the on-off valve 50 is a certain value.

FIG. 5 is a graph showing the gas and water exhaust volume per unit of time when the pressure Pe within the on-off valve 50 is a certain value. The vertical axis represents the gas and water exhaust volume per unit of time. The horizontal axis represents time. The graph Qg represents the change in gas exhaust volume per unit of time when only gas is exhausted from the on-off valve 50. The graph Qw represents the changes in exhaust volume of gas and water per unit of time when water and gas are exhausted from the on-off valve 50.

From graph Qg, we can see that the gas exhaust volume per unit of time when only gas is exhausted from the on-off valve 50 increases with time. In contrast to this, from graph Qw, we can see that the gas exhaust volume per unit of time when water and gas are exhausted from the on-off valve 50 almost doesn't increase at all after a designated volume is reached. This is because cavitation occurs in exhausted water, inhibiting the exhausting of water and gas from the on-off valve 50. Cavitation occurs easily when the pressure difference inside and outside the on-off valve 50 is greater than a designated value. When cavitation occurs, the noise increases, and it is easy for corrosion of the members constituting the on-off valve 50 to progress.

Accordingly, the duty ratio D4 of the injector 62 at time period Tp5 in FIG. 4 is set so that the pressure Pe inside the on-off valve 50 is lower than the value for which cavitation occurs easily. More specifically, the duty ratio D4 of the injector 62 is set as described hereafter.

It is possible to measure in advance the pressure loss (mainly pressure loss by the fuel cell 22) downstream from the injector 62 and up to the gas-liquid separator 27 when the pressure Po of the hydrogen gas downstream of the injector 62, specifically, upstream of the fuel cell 22, is a certain value. Accordingly, the target pressure Pot of the hydrogen gas on the downstream side of the injector 62 (upstream side of the fuel cell 22) is set taking into consideration the pressure loss of the fuel cell 22 and the like such that the pressure Pe within the on-off valve 50 of the gas-liquid separator 27 is less than the value at which cavitation occurs. Then, the duty ratio D4 of the injector 62 is set so that the pressure of the hydrogen gas on the downstream side of the injector 62 is Pot.

In contrast, for the duty ratio D6 of the injector 62 when only gas is exhausted from the on-off valve 50, there are no limits relating to the occurrence of cavitation (see time period Tp8 in FIG. 4). Thus, the duty ratio D6 is set so that the pressure Po of the hydrogen gas on the downstream side of the injector 62 is higher than with the duty ratio D4 (P7>P5, D6>D4). By setting the duty ratios D4 and D6 of the injector 62 in this way, when water and gas are exhausted from the on-off valve 50, it is possible to efficiently exhaust water and gas without cavitation occurring. Then, when only gas is exhausted from the on-off valve 50, it is possible to efficiently exhaust gas at an even higher pressure.

Meanwhile, the duty ratio D6 is set under the following kinds of restrictions based on the performance of an air compressor 24 or the like which supplies compressed air to the diluter 26 and the fuel cell 22. Specifically, in FIG. 4, the duty ratio D6 is shown as a fixed value to make it easier to understand the technology. However, in actuality, the control unit 70 controls the duty ratio D6 so that the hydrogen concentration of exhaust gas exhausted from the diluter 26 is less than a designated value (e.g. 3.9%).

Figure 6:
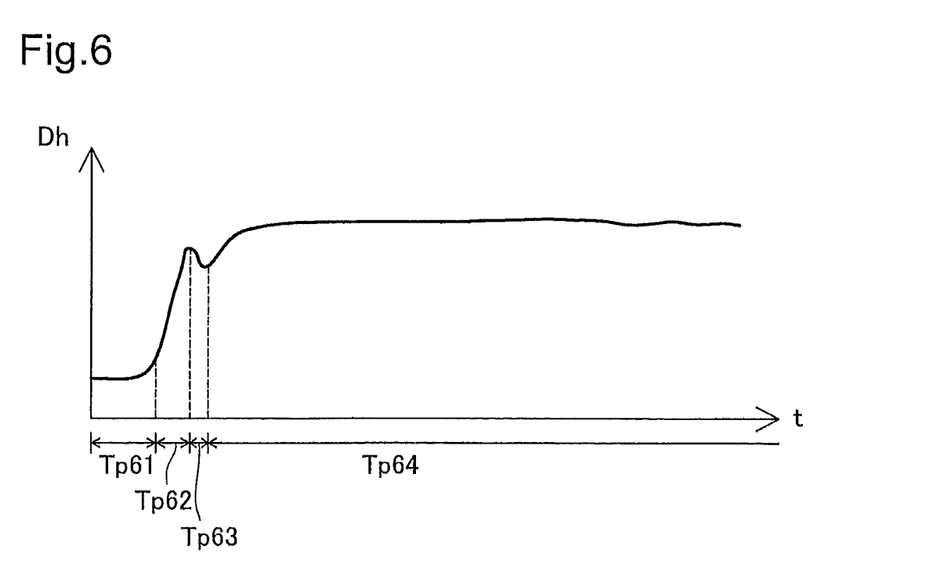
FIG. 6 is a graph representing the hydrogen concentration Dh in the exhaust gas exhausted from the diluter 26.

FIG. 6 is a graph representing the hydrogen concentration Dh in exhaust gas exhausted from the diluter 26. The vertical axis represents the hydrogen concentration Dh. The horizontal axis represents time. When the on-off valve 50 is opened at time t3 in FIG. 4, at the start, almost water only is exhausted from the on-off valve 50. That time period correlates to time period Tp61 in FIG. 6. After that, when gas starts to be exhausted from the on-off valve 50, the hydrogen concentration Dh of the exhaust gas exhausted from the diluter 26 rises rapidly (see time period Tp62 in FIG. 6). Then, when control unit 70 control relating to the hydrogen concentration is interposed, it decreases once (see time period Tp63 in FIG. 6). Then, after that, the hydrogen concentration Dh of the exhaust gas exhausted from the diluter 26 is kept at less than a designated value (see time period Tp64 in FIG. 6).

When the supply volume of cathode exhaust gas per unit of time is fixed, the hydrogen concentration of the exhaust gas exhausted from the diluter 26 is proportional to the volume per unit of time of gas exhausted from the on-off valve 50. Then, the volume of gas per unit of time exhausted from the on-off valve 50 is proportional to the pressure difference inside and outside the on-off valve 50. The pressure outside the on-off valve 50, specifically, the pressure Pe within the gas-liquid exhaust path 64 and the diluter 26 can be found based on the operating conditions of the fuel cell system. Meanwhile, the pressure within the on-off valve 50 also, as described previously, can be found based on the pressure Po of the hydrogen gas on the downstream side of the injector 62, specifically, the upstream side of the fuel cell 22. Thus, the control unit 70 controls the duty ratio D6 of the injector 62 such that the difference between the pressure within the on-off valve 50 and the pressure Pe of the gas-liquid exhaust path 64 is less than a designated value correlating to the hydrogen concentration 3.9% of exhaust gas after dilution.

Figure 7:
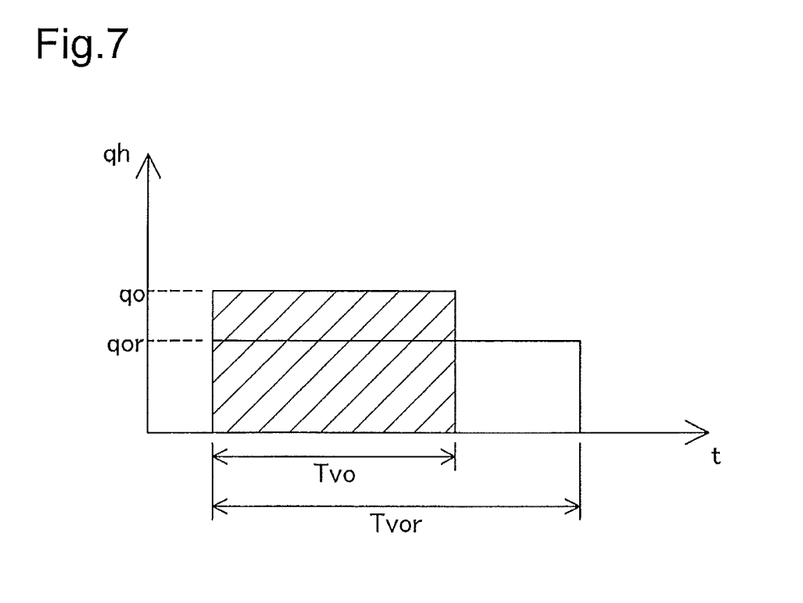
FIG. 7 is a graph showing changes in the valve opening time.

FIG. 7 is a graph showing changes in the valve opening time. The vertical axis represents the volume per unit of time of the gas exhausted from the on-off valve 50. The horizontal axis represents time. As described previously, the time Tvo at which the on-off valve 50 is opened is set based on the valve map Mv. For example, the valve opening control contents are set based on the valve map Mv so that the on-off valve 50 opens fore time period Tvo.

However, depending on the operating state of the fuel cell 22 after that, there may be cases that it is not possible to sufficiently exhaust impurities to outside the system by the time Tvo set based on the valve map Mv, while keeping the hydrogen concentration of the exhaust gas after dilution at less than 3.9%. More specifically, to sufficiently exhaust impurities to outside the system at time Tvo, it is necessary that the hydrogen gas exhaust volume per unit of time be Qo, and in that case, there are cases that the hydrogen concentration of the exhaust gas after dilution exceeds 3.9%. In such a case, as described previously, the control unit 70, while controlling the duty ratio D6 of the injector 62 so that the hydrogen concentration of the exhaust gas after dilution can be less than 3.9%, extends the time for opening the on-off valve 50 from the time Tvo set based on the valve map Mv. As a result, each part is controlled so that the exhaust volume is Qor per unit of time (Qor<Qo), and the on-off valve 50 is open for time Tvor (Tvor>Tvo).

By performing this kind of control, while keeping the hydrogen concentration of the exhaust gas after dilution less than a designated value, it is possible to exhaust impurities from the fuel gas circulation system, and to make the concentration of the hydrogen gas supplied to the fuel cell a fixed value or greater.

B. SECOND EMBODIMENT

With the fuel cell system of the second embodiment, the contents of the feedback control of the injector 62 for maintaining the target pressure, the method of detecting that the on-off valve 50 has opened (see time t4 in FIG. 4), and the method of deciding the timing for closing the on-off valve 50 are different from the fuel cell system 10 of the first embodiment. The other points of the fuel cell system of the second embodiment including the hardware configuration are the same as the fuel cell system 10 with the first embodiment.

B1. Injector Control and Open Valve Detection for Maintaining Standard Pressure

Figure 8:
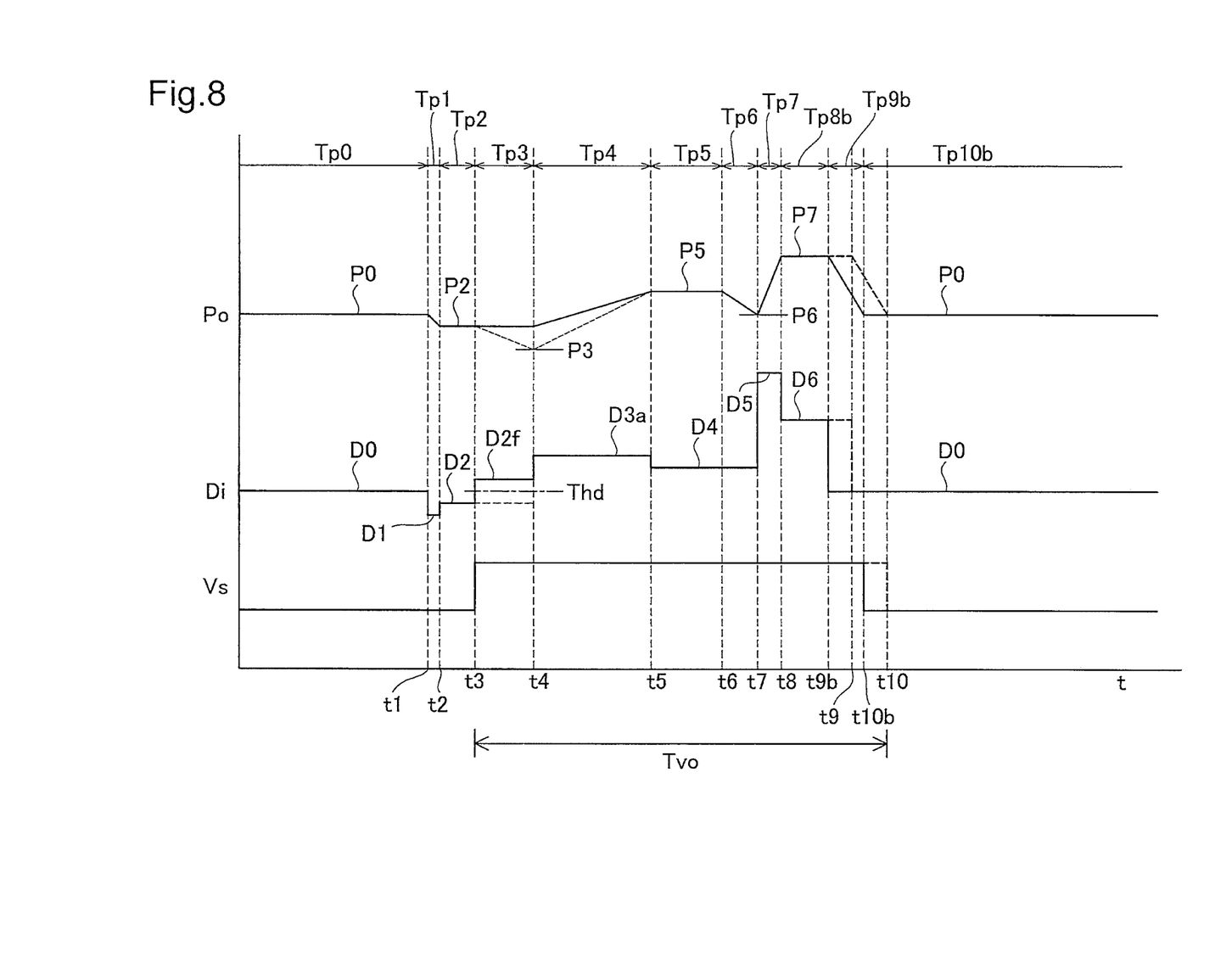
FIG. 8 is a chart showing the injector 62 control contents performed by the control unit 70 with the second embodiment.

FIG. 8 is a chart showing the contents of control of the injector 62 performed by the control unit 70 with the second embodiment. In FIG. 8, the same code numbers as in FIG. 4 represent the same objects as in FIG. 4. In FIG. 8, the pressure Po of the hydrogen gas on the downstream side of the injector and the duty ratio Di of the first embodiment are shown with dashed lines for reference.

With the second embodiment, with the control of the injector 62 to control the pressure Po of the hydrogen gas on the downstream side of the injector 62 to be the target pressure, feedback control is performed at a faster response speed than with the first embodiment. With the second embodiment, the feedback control of the injector 62 is performed with a signal representing the difference between the hydrogen gas pressure Po measured by the pressure sensor 66b on the downstream side of the injector 62 and the target pressure as the feedback signal.

With the second embodiment, at time t3, the on-off valve 50 is opened and exhausting of water and gas starts. When the pressure Po of the hydrogen gas on the downstream side of the injector 62 slightly decreases, the control unit 70 makes the duty ratio Di a higher value. Then, the control unit 70 sets the duty ratio Di so that the pressure Po of the hydrogen gas on the downstream side of the injector 62 is maintained at P2 which is the target pressure. As a result, the pressure Po of the hydrogen gas on the downstream side of the injector 62 almost doesn't decrease at all, and the duty ratio Di of the injector 62 changes from D2 to D2f (D2f>D2) (see time period Tp3 in FIG. 8).

When it is detected that the duty ratio Di of the injector 62 has reached a value higher than the designated threshold Thd by feedback control, the control unit 70 raises the duty ratio Di of the injector 62 to a higher D3a(D2f<D3a<D3) (time t4 in FIG. 8). As the threshold value Thd, a value is set that is greater than the duty ratio D2 before the on-off valve 50 opens, and is also smaller than the duty ratio D2f assumed at the initial stage after the on-off valve 50 has opened. When the duty ratio Di of the injector 62 is set to D3a, the pressure Po of the hydrogen gas on the downstream side of the injector 62 is raised from P2 to P5 at time period Tp4 (P5>P0).

With such an aspect, without using the measurement value of the pressure sensor 66b as with the first embodiment, it is possible to detect (see time period Tp3) that the on-off valve 50 has opened based on the control state of the injector 62 (more specifically, the duty ratio), and to make the pressure Po of the hydrogen gas on the downstream side of the injector 62 be higher than before the valve opens (see time period Tp4).

B2. Valve Closing Decision

With the second embodiment, when the conditions described hereafter are satisfied, the control unit 70 closes the on-off valve 50 even if the time since the valve was opened has not reached the time Tvo set according to the valve map Mv.

(i) Mean Molecular Weight of Gas Exhausted from the On-Off Valve:

The gas inside the on-off valve 50 includes hydrogen gas as the fuel gas, and nitrogen gas and water vapor as impurities. The molecular weight of the hydrogen gas is 2. The molecular weight of the nitrogen gas is 14. The molecular weight of the water vapor (water) is 18. Accordingly, the mean molecular weight of the gas exhausted from the exhaust valve is 2 to 18. Meanwhile, the molecular weight of the hydrogen gas as the fuel gas is 2.

Figure 9:
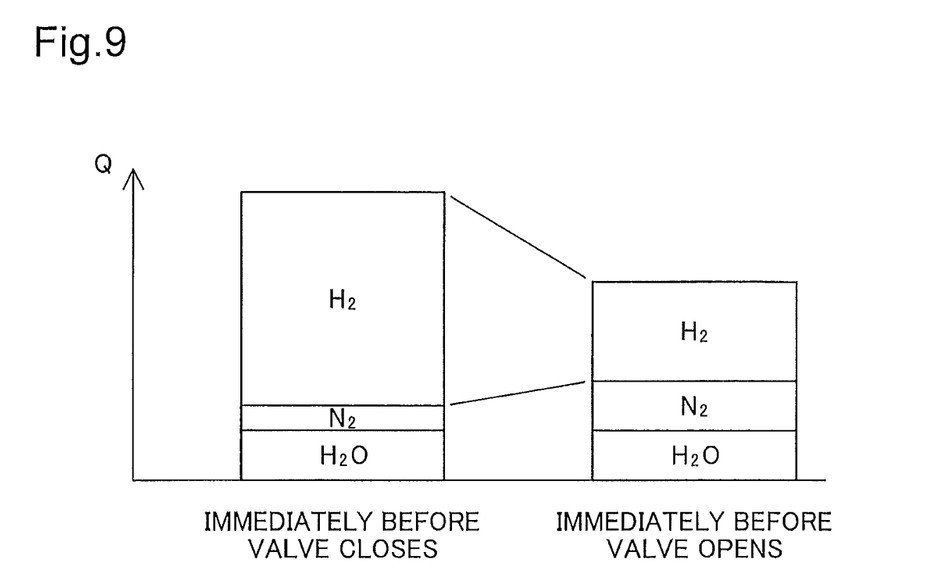
FIG. 9 is a graph representing the contents of the gas exhausted from the on-off valve 50 immediately after the on-off valve 50 is opened, and the contents of the gas exhausted from the on-off valve 50 immediately before the on-off valve 50 is closed.

FIG. 9 is a graph representing the contents of the gas exhausted from the on-off valve 50 immediately after the on-off valve 50 is opened, and the contents of the gas exhausted from within the on-off valve 50 immediately before the on-off valve 50 is closed. The vertical axis in FIG. 9 is the flow volume of gas per unit of time. The graph at the right side represents the contents of the gas exhausted from the on-off valve 50 immediately after the on-off valve 50 is opened. The graph at the left side represents the contents of the gas exhausted from inside the on-off valve 50 immediately before the on-off valve 50 is closed.

During open valve time with the on-off valve 50, gas containing a large amount of impurities is exhausted from the fuel gas circulation system via the exhaust valve, and when high pressure fuel gas is supplied to that system from the hydrogen tank 23 (see time periods Tp5 and Tp8 in FIG. 8), within the system, the volume of nitrogen gas decreases, and the volume of hydrogen gas increases (see FIG. 9). When the power generation volume at the fuel cell 22 is made not to change, the water generating volume per unit of time doesn't change. Accordingly, the water volume in the graph in FIG. 9 does not change.

When the replacement of the gas in the fuel gas circulation system like that noted above advances, the mean molecular weight m of the gas exhausted via the on-off valve 50 gradually approaches the molecular weight 2 of hydrogen. Specifically, the mean molecular weight m gradually becomes smaller. When the mean molecular weight m becomes smaller than a designated value, it is possible to determine that the impurities have been sufficiently exhausted from the fuel gas circulation system.

Meanwhile, the square root of the mean molecular weight m of the gas exhausted from the on-off valve 50 is inversely proportional to the flow volume Q per unit of time of the gas exhausted from the on-off valve 50. Hereafter, we will describe the method of setting the flow volume Q per unit of time of the gas exhausted from the on-off valve 50, divided into nitrogen gas, water vapor, and hydrogen.

Figure 10:
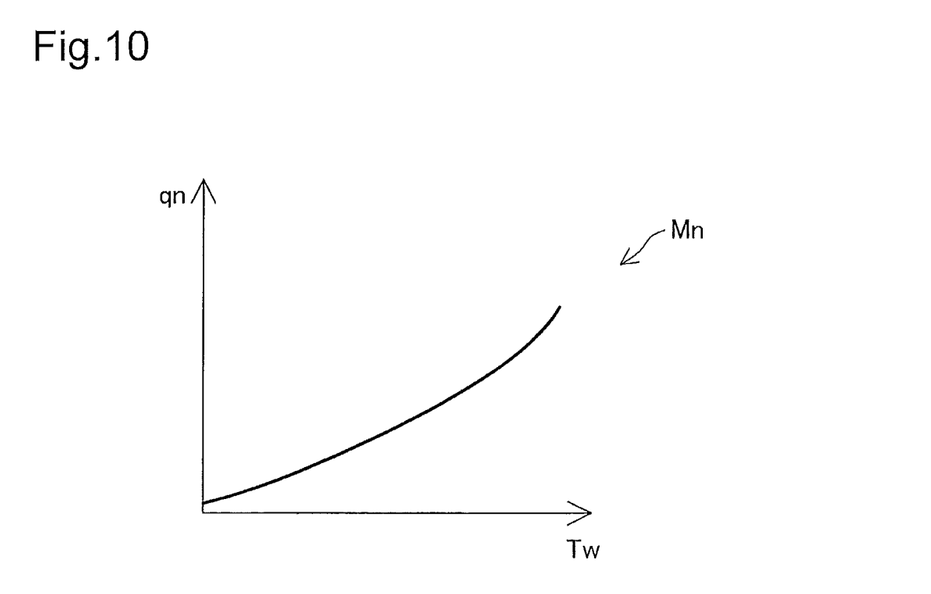
FIG. 10 is a drawing representing a map Mn relating to the quantity qn per unit of time of nitrogen gas exhausted from the on-off valve 50 which the control unit 70 has.

(ii) Volume Per Unit of Time of Nitrogen Gas Exhausted from the On-Off Valve:

FIG. 10 is a drawing representing the map Mn relating to the quantity per unit of time of nitrogen gas qn exhausted from the on-off valve 50. The vertical axis of FIG. 10 represents the quantity per unit of time of nitrogen gas qn exhausted from the on-off valve 50. The horizontal axis of the drawing 10 represents the temperature of the cooling water Tw of the fuel cell 22. Of the gases exhausted from the on-off valve 50, the nitrogen mixes into the fuel gas circulation system mainly due to cross leak that occurs with the fuel cell 22. The volume of the nitrogen cross leak correlates to the temperature of the fuel cell 22. Then, the temperature of the fuel cell 22 can be set based on the cooling water temperature Tw detected by the temperature sensor 43 provided in the cooling water path 41.

Thus, once the configuration of the fuel cell system is decided, it is possible to produce a map Mn (see FIG. 10) for setting the volume per unit of time of nitrogen gas qn exhausted from the on-off valve 50. The control unit 70 holds a map Mn for nitrogen gas provided in this way in advance.

Figure 11:
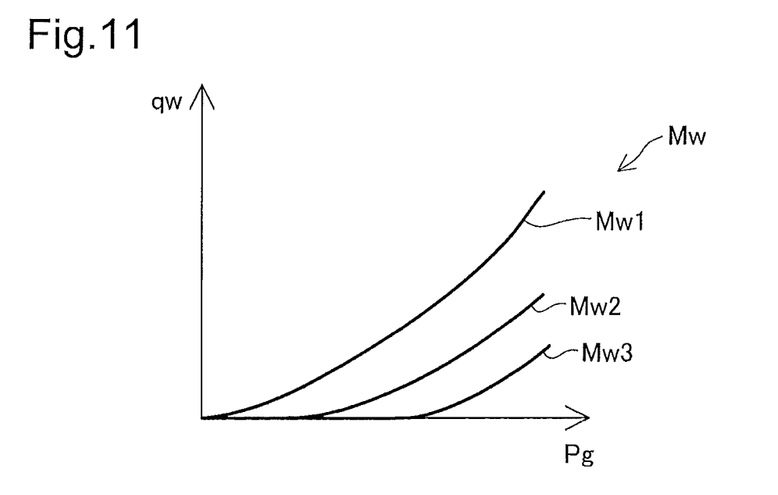
FIG. 11 is a drawing representing maps Mw1, Mw2, and Mw3 relating to the quantity qw of water vapor per unit of time exhausted from the on-off valve 50 that the control unit 70 has.

(iii) Volume Per Unit of Time of Water Vapor Exhausted from the On-Off Valve:

FIG. 11 is a drawing representing maps Mw1, Mw2, and Mw3 relating to the quantity of water vapor per unit of time qw exhausted from the on-off valve 50. The vertical axis in FIG. 11 represents the volume per unit of time of water qw exhausted from the on-off valve 50. The horizontal axis in FIG. 11 represents the power generation volume Pg per unit of time of the fuel cell 22. Of the gases exhausted from the on-off valve 50, water vapor is mainly due to water generated by power generation at the fuel cell 22. This water vapor quantity correlates to the power generation volume Pg at the fuel cell 22 and the temperature of the fuel cell 22. The power generation volume at the fuel cell 22 can be set based on the volume obtained by doing integration of the current volume detected by the ammeter 35 by the time period for the time unit. The temperature of the fuel cell 22 can be set based on the cooling water temperature Tw detected by the temperature sensor 43.

Thus, once the configuration of the fuel cell system is decided, it is possible to produce maps Mw1, Mw2, and Mw3 (see FIG. 11) for setting the quantity of water vapor per unit of time qw exhausted from the on-off valve 50 from the power generation volume of the fuel cell 22 (current volume) and the cooling water temperature Tw of the fuel cell 22. The maps Mw1 Mw2, and Mw3 respectively representing the relationship of the power generation volume Pg and the water vapor volume correspond to mutually differing cooling water temperatures Tw1, Tw2, and Tw3 (Tw1<Tw2<Tw3). Here, to make the technology easier to understand, only three maps representing the relationship of the power generation volume Pg and the water vapor volume are shown. However, actually, a larger number of maps are generated. Those maps representing the relationship of the power generation volume Pg and the water vapor volume are collectively referred to as water vapor maps Mw. The control unit 70 holds the water vapor maps Mw provided in advance.

(iv) Volume Per Unit of Time of Hydrogen Gas Exhausted from the On-Off Valve:

Of the gases exhausted from the on-off valve 50, the volume of hydrogen gas is obtained as the difference between the hydrogen supplied to the fuel cell 22 via the injector 62 and the hydrogen consumed by power generation at the fuel cell 22. Then, the volume of hydrogen supplied to the fuel cell 22 via the injector 62 can be determined based on the volume obtained by doing integration of the pressure difference before and after the injector 62 by the time period for the unit of time. Here, the pressure on the upstream side of the injector 62 can be obtained by the pressure sensor 66a. The pressure on the downstream side of the injector 62 can be obtained by the pressure sensor 66b. Also, the volume of hydrogen consumed by power generation at the fuel cell 22 can be set based on the power generation volume at the fuel cell 22. Then, the power generation volume at the fuel cell 22 can be set based on the volume obtained by doing integration of the current volume detected by the ammeter 35 by time.

Thus, once the configuration of the fuel cell system is decided, it is to possible to create the map Mh for setting the quantity per unit of time of hydrogen gas qh exhausted from the on-off valve 50 from the power generation volume (current volume) of the fuel cell 22, the cooling water temperature Tw, and the upstream and downstream pressures of the injector 62. The control unit 70 holds the map Mh for hydrogen gas provided in this way in advance.

(v) Valve Closing Decision:

From the above, while referring to the maps Mn, Mw, and Mh, the control unit 70 is able to obtain a flow quantity Q per unit of time of the gases exhausted from the on-off valve 50 from the temperature of the cooling water detected by the temperature sensor 43, the current volume detected by the ammeter 35, and the pressures detected by the pressure sensors 66a and 66b.

With the second embodiment, the control unit 70 calculates the parameter Pvc based on the temperature of the cooling water detected by the temperature sensor 43, the current volume detected by the ammeter 35, and the pressures detected by the pressure sensors 66a and 66b. This parameter Pvc represents the flow volume Q per unit of time of gas exhausted from the on-off valve 50. Thus, the parameter Pvc is inversely proportional to the square root of the mean molecular weight m of gases exhausted from the on-off valve 50.

The control unit 70 closes the on-off valve 50 (see time t10b in FIG. 8) when the parameter Pvc exceeds a designated threshold value Thc, even if the time from valve opening has not reached the time Tvo determined according to the valve map Mv. By using this kind of mode, when the mean molecular weight m of the gases exhausted from the on-off valve 50 becomes smaller than the designated value, and the impurities are sufficiently exhausted from the gases circulating in the fuel gas circulation system, the on-off valve 50 can be closed.

Accordingly, it is possible to prevent the hydrogen gas as fuel gas from being excessively exhausted from the fuel gas circulation system. It is also possible to prevent high concentration hydrogen gas from being exhausted from the fuel gas circulation system.

With the second embodiment, the following points are the same as with the first embodiment (see time t9b in FIG. 8): before the time t10b for closing the on-off valve 50, the duty ratio Di of the injector 62 is reduced from duty ratio D6 to D0 and the pressure of the hydrogen gas on the downstream side of the injector 62 is reduced. Of the times or time periods shown in FIG. 8, for items correlating to the times or time periods shown in FIG. 4, "b" is attached to the end.

C. MODIFICATIONS EXAMPLES

The present invention is not limited to the embodiments or modes noted above, and various modes can be implemented in a scope which does not depart from its main concept, with modifications such as the following possible, for example.

C1. Modification Example 1

With the embodiments noted above, by detecting the fact that the decrease per unit of time of the pressure Po on the downstream side of the injector 62 after the valve is opened is greater than the designated threshold value Tr6 is detected, the completion of exhausting of liquid water is detected, and the duty Di is raised (see Tp6 in FIG. 4 and FIG. 8). However, after the valve is opened, the time at which the duty Di is raised can also be set in advance.

Figure 12:
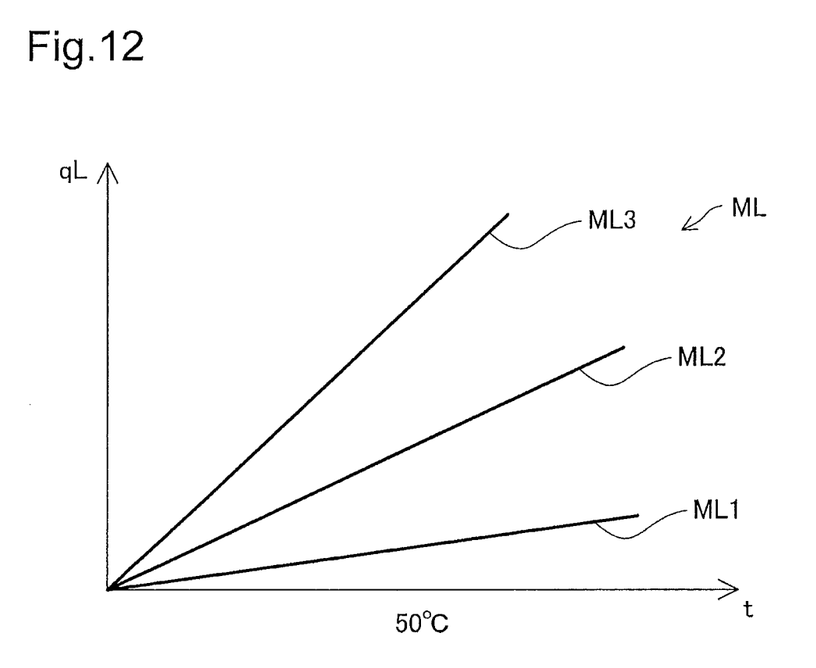
FIG. 12 is a graph showing the quantity qL of liquid water to be exhausted from the liquid separator 27 when the cooling water temperature Tw is 50 degrees.

FIG. 12 is a graph showing the liquid water quantity qL to be exhausted from the liquid separator 27. The liquid water to be exhausted from the liquid separator 27 is also mainly due to the water generated by power generation at the fuel cell 22. This liquid water quantity qL to be exhausted correlates to the power generation volume at the fuel cell 22 and the temperature of the fuel cell 22. For example, when the power generation volume (current volume) and the fuel cell 22 temperature (cooling water temperature) are fixed, as shown in FIG. 12, the water quantity qL to be exhausted increases as time passes. The current volume can be detected by the ammeter 35. The temperature of the fuel cell 22 can be set based on the cooling water temperature Tw detected by the temperature sensor 43.

Thus, once the configuration of the fuel cell system is decided, it is possible to create the maps ML1, ML2, and ML3 (see FIG. 12) for setting the quantity qL of liquid water to be exhausted from the power generation volume (current volume) of the fuel cell 22 and the cooling water temperature Tw of the fuel cell 22. The maps ML1, ML2, and ML3 respectively representing the relationship of the elapsed time and the water quantity qL correspond to mutually different current values TL1, TL2, and TL3 (TL1<TL2<TL3). Here, to make the technology easier to understand, only three maps representing the relationship of the elapsed time and water quantity qL are shown. However, actually, a larger number of maps are generated. The maps representing the relationship between the elapsed time and water vapor volume are collectively called water vapor maps ML. The control unit 70 holds the water vapor maps ML provided in advance, and based on those, it is possible to set the time for increasing the duty Di (see t4 in FIG. 4 and FIG. 8).

C2. Modification Example 2

With the embodiment noted above, the element which supplies the pressure adjusted fuel gas to the fuel cell 22 is the injector 62 which is capable of PWM control. However, the constitution for supplying pressure adjusted fuel gas to the fuel cell 22 can be a pressure regulating valve using another method.

C3. Modification Example 3

With the second embodiment noted above, the fact that the on-off valve 50 had been opened was detected based on the duty Di of the injector 62 (see time period Tp3 in FIG. 8). However, the fact that the on-off valve 50 is opened can also be detected using another method. For example, it is also possible to detect the fact that the on-off valve 50 has been opened by detecting that the difference between the pressure Po of the hydrogen gas measured by the pressure sensor 66b on the downstream side of the injector 62 and the target pressure has become greater than the designated value. In more specific terms, it is possible to perform this kind of control by monitoring the feedback signals of the injector 62.

Even with this kind of mode, without using a measurement value of the pressure sensor 66b as with the first embodiment, it is possible to detect that the on-off valve 50 has opened, and to make the pressure Po of the hydrogen gas on the downstream side of the injector 62 higher than before the valve opened.

C4. Modification Example 4

With the first embodiment noted above, by detecting the changes in pressure between the injector 62 and the fuel cell 22 using the pressure sensor 66b, the fact that the on-off valve 50 has been opened is detected (see time period Tp3 in FIG. 4). However, the pressure sensor for detecting that the on-off valve 50 has been opened can also be provided at a different site such as the downstream side of the fuel cell 22 or the like. Specifically, it is also possible to use a sensor that measures the pressure of fuel gas to be supplied to the fuel cell, or to use a sensor that measures the pressure of fuel gas exhausted from the fuel cell.

The pressure sensor for detecting that the on-off valve 50 has been opened can be provided on the downstream side of the injector 62 as the pressure control unit. However, it is preferable that the pressure sensor be provided on the upstream side of the fuel cell 22. By using that kind of mode, it is possible to prevent the situation of the pressure sensor disoperation by the water freezing included in the anode gas circulation system.

C5. Modification Example 5

With the first embodiment noted above, when the decrease per unit of time of the pressure Po on the downstream side of the injector 62 is detected to have become greater than the designated threshold value Tr6, the control unit 70 raises the duty ratio Di of the injector 62 from D4 to D5 (see time periods Tp6 and Tp7 in FIG. 4). However, after water is exhausted, the timing of raising the duty ratio Di of the injector 62 can also be detected using another method.

For example, it is also possible to use a mode whereby the fact that the pressure of the fuel gas circulation system has decreased more than a designated value is detected, and then the pressure control unit raises the pressure. Also, when the response speed of the feedback control of the pressure control unit is sufficiently fast, as with the detection of the valve being open in the second embodiment, it is possible to detect water exhaust based on the pressure control unit state (duty Di) or the feedback signals. Also, after the valve is opened, it is possible to assume that the water exhaust is completed by the elapsing of a designated time, and to perform the following control.

For the method of detection of the valve opening described with the embodiments and modification examples (see time period Tp3 in FIG. 4 and FIG. 8), and for the method of detection of water exhaust (see time period Tp6 in FIG. 4 and FIG. 8), it is possible to apply other methods for their respective objectives.

C6. Modification Example 6

With the embodiments noted above, the temperature of the fuel cell 22 is set based on the cooling water temperature Tw. However, the temperature of the fuel cell 22 can also be set using another method. Then, the temperature of the fuel cell 22 can be set based on the temperature of another element for which that temperature has a correlation with the temperature of the fuel cell 22 (e.g. cooling water or a cooling water pipe, or another structure attached to the fuel cell 22).

C7. Modification Example 7

Above, the invention of this application is described in detail while referring to preferred exemplary embodiments. However, the present invention is not limited to the embodiments and configurations described above. Also, the present invention includes various modifications and equivalent configurations. Furthermore, the various elements of the disclosed invention have been disclosed with various combinations and configurations, but those are exemplary items, and it is also possible to have more elements or fewer elements. It is also possible to have just one element. Those modes are included within the scope of the invention of this application.

The invention claimed is:

1. A fuel cell system, comprising:
a fuel cell,
a pressure control unit provided in a fuel gas flow path in which fuel gas to be supplied to the fuel cell flows, the pressure control unit configured to control a pressure of the fuel gas to be supplied to the fuel cell,
an exhaust valve provided on a fuel exhaust gas flow path in which fuel exhaust gas exhausted from the fuel cell flows, wherein when the exhaust valve is opened, the exhaust valve configured to open inward and exhaust to an outside of the fuel exhaust gas flow path at least a portion of the fuel exhaust gas, and
a control unit that is programmed to control the fuel system, wherein
the control unit
decreases the pressure of the fuel gas to be supplied to the fuel cell to a first pressure,
opens the exhaust valve when the pressure of the fuel gas to be supplied to the fuel cell is the first pressure,
controls the pressure control unit to make the pressure of the fuel gas to be supplied to the fuel cell a second pressure at least for a designated time period after the exhaust valve is opened, the second pressure being higher than the first pressure,
performs feedback control of the pressure control unit so that the pressure of the fuel gas to be supplied to the fuel cell keeps a designated pressure when power generation is performed at the fuel cell, and
based on a change in at least one of a feedback signal in the feedback control and an operating state of the pressure control unit, detects that the exhaust valve has opened, and sets the pressure of the fuel gas to be supplied to the fuel cell to the second pressure, the change leading to an increase in a volume of the fuel gas to be supplied to the fuel cell.

2. The fuel cell system according to claim 1, further comprising:
a pressure sensor for detecting, downstream from the pressure control unit, at least one of pressures of the fuel gas to be supplied to the fuel cell and the fuel exhaust gas, wherein
the control unit detects that the exhaust valve has opened based on a decrease in a measured value obtained by the pressure sensor.

3. The fuel cell system according to claim 1, wherein the control unit, after setting the pressure of the fuel gas to be supplied to the fuel cell to the second pressure, controls the pressure control unit to make the pressure of the fuel gas to be supplied to the fuel cell a third pressure in a state with the exhaust valve opened, the third pressure being higher than the second pressure.

4. The fuel cell system according to claim 3, further comprising:
a pressure sensor for detecting at least one of pressures of the fuel gas to be supplied to the fuel cell and the fuel exhaust gas, downstream from the pressure control unit, wherein
the control unit, after the decrease of the measured value obtained by the pressure sensor in a designated time period has exceeded a designated threshold value, performs the process of making the pressure of the fuel gas to be supplied to the fuel cell the third pressure.

5. The fuel cell system according to claim 1, further comprising:
a circulation flow path that returns a portion of the exhaust gas flowing inside the fuel exhaust gas flow path to the fuel gas flow path, a temperature sensor for determining a temperature of the fuel cell,
an ammeter for determining the volume of current flowing from the fuel cell,
a first pressure sensor that measures a pressure of the fuel gas supplied from a fuel gas supply source to the pressure control unit, and
a second pressure sensor that measures a pressure of the fuel gas supplied from the pressure control unit to the fuel cell, wherein
the pressure control unit is an injector provided in the fuel gas flow path between the fuel gas supply source and the fuel cell, the injector configured to supply hydrogen gas as fuel gas supplied from the fuel gas supply source to the fuel cell at a controlled pressure, wherein
the control unit
when the valve is open, while exhausting gas from the exhaust valve, supplies fuel gas supplied from the fuel gas supply source via the pressure control unit to the fuel cell, and
when a parameter exceeds a designated value, closes the exhaust valve, the parameter being obtained based on the pressure of the fuel gas supplied from the fuel gas supply source to the pressure control unit, the pressure of the fuel gas supplied by the pressure control unit to the fuel cell, the temperature of the fuel cell, and the current that the fuel cell outputs, the parameter representing a flow volume per unit of time of the exhausted gas.

6. The fuel cell system according to claim 1, wherein the control unit
controls the pressure control unit to decrease the pressure of the fuel gas to be supplied to the fuel cell before closing the exhaust valve, and
closes the exhaust valve in a state for which the pressure of the fuel gas to be supplied to the fuel cell is decreased.

* * * * *